July 17, 1962 E. J. SVENSON 3,044,266
HYDRAULIC ACTUATING METHOD
Original Filed Dec. 20, 1954 6 Sheets—Sheet 1

Fig. 1.

INVENTOR.
Ernest J. Svenson
BY Olson, Trexler
Wolter & Bushnell attys.

July 17, 1962 E. J. SVENSON 3,044,266
HYDRAULIC ACTUATING METHOD
Original Filed Dec. 20, 1954 6 Sheets-Sheet 4

INVENTOR.
Ernest J. Svenson
BY Olson & Trexler
Attys.

July 17, 1962  E. J. SVENSON  3,044,266
HYDRAULIC ACTUATING METHOD
Original Filed Dec. 20, 1954  6 Sheets-Sheet 5

INVENTOR.
Ernest J. Svenson
BY Olson & Trexler
attys.

United States Patent Office 3,044,266
Patented July 17, 1962

3,044,266
HYDRAULIC ACTUATING METHOD
Ernest J. Svenson, Rockford, Ill., assignor to Odin Corporation, Rockford, Ill., a corporation of Illinois
Original application Dec. 20, 1954, Ser. No. 476,281, now Patent No. 2,924,939, dated Feb. 16, 1960. Divided and this application Apr. 17, 1959, Ser. No. 807,135
3 Claims. (Cl. 60—52)

This application is a division of my copending application Serial No. 476,281, filed December 20, 1954, now Patent 2,924,939, dated February 16, 1960, relating to a hydraulic actuating apparatus, and is concerned with a method of actuating a fluid motor.

One problem confronting the machine tool industry is that of shifting elements of the tool with sufficient accuracy to obtain the desired results. For example, if the shiftable element of the machine carries a tool or a workpiece, it is necessary that the shiftable element be moved in a predetermined manner and with great accuracy so that the workpiece will be provided with the desired dimensions or finish. It will be apparent that in such machines, it is necessary to stop the shiftable element at the end of the feeding motion with great accuracy and in machines heretofore in use, whether incorporating mechanical or hydraulic feeding mechanisms, it has generally been necessary to provide a mechanical positive stop for limiting the movement of the shiftable element in order to obtain the desired accuracy. One reason for this when a hydraulic actuating mechanism is used is that the hydraulic fluid compresses slightly when placed under actuating pressure. For example, the United States Bureau of Standards gives the compressibility of a fluid such as turbine oil which is commonly used in actuating systems as approximately one-half of one percent when the pressure is raised from one to one thousand p.s.i. This compressibility of the hydraulic fluid not only precludes great accuracy in stopping of the actuator element of many structures heretofore in use without the aid of a mechanical stop, but also may cause the movement of the hydraulically actuated member to be uneven. More specifically, when the fluid is first placed under pressure the shiftable element or piston will remain substantially stationary until the fluid has been compressed whereupon the piston will jump forwardly, then slow down or stop as the fluid expands whereupon the fluid will again be compressed and the piston will again jump forwardly. While these effects resulting from the compressibility of the hydraulic fluid are not unduly objectionable in many of the machines heretofore in use, there are instances when it is desirable to move the shiftable element or piston at an extremely uniform rate and to stop the piston or shiftable element with an extreme degree of accuracy. It is, therefore, an important object of the present invention to provide a novel method of actuating a fluid motor wherein the effect of the compressibility of the hydraulic actuating fluid is substantially eliminated.

A more specific object of the present invention is to provide a novel method of actuating a fluid motor so that the shiftable element or piston of a hydraulic actuating apparatus may be stopped with a high degree of accuracy. In accordance with this invention, the actuating member or piston may be stopped within .00001 (one hundred thousandth) of an inch or less.

Another object of the present invention is to provide a method wherein the actuated member or piston may be stopped with a high degree of accuracy at various times and at various positions without the aid of a positive mechanical stop.

Still another object of the present invention is to provide a method wherein the actuated member or piston may be started and moved at an extremely uniform rate.

A further object of the present invention is to provide a method such that the actuated member or piston may not only be shifted at a substantially uniform rate but may also be shifted at a slower rate which may be on the order of .0001 (one ten thousandth) of an inch per second whereby the total distance which the actuated member or piston is fed may be determined by a timer, if desired.

Other objects and advantages of the present invention will become apparent from the following description and the accompanying drawings wherein.

Figure 1:
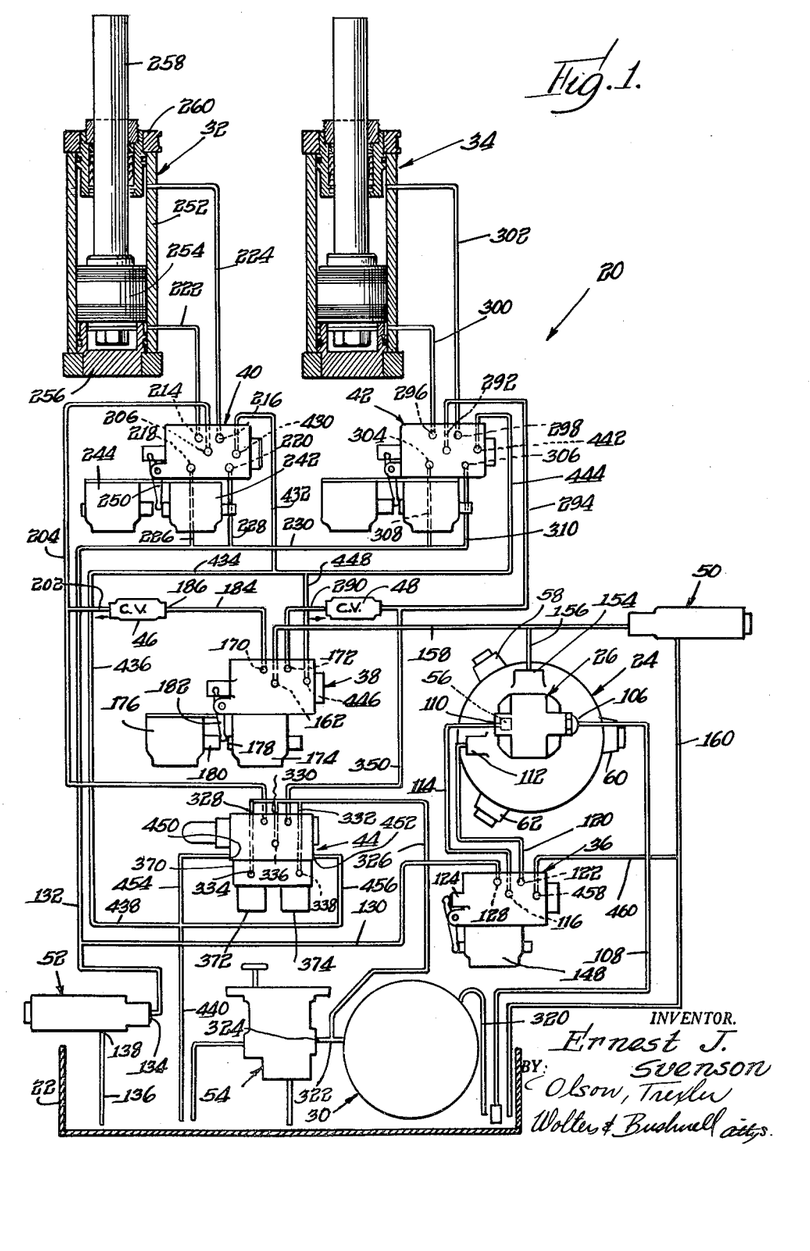
FIG. 1 is a diagrammatic view illustrating a hydraulic actuating apparatus for carrying out the principles of this invention.

Referring now more specifically to the drawings wherein like parts are designated by the same numerals throughout the various figures, an apparatus 20 to carry out this invention is diagrammatically shown in FIG. 1. In general, this apparatus includes a reservoir 22 for hydraulic fluid, a feed pump assembly 24 including a gear pump 26 and a plunger type pump 28, a rapid traverse pump 30, a pair of fluid motors 32 and 34, a two-position four-way control valve 36, a plurality of two-position four-way control valves 38, 40 and 42, a three-position four-way directional control valve 44, a pair of check valves 46 and 48, a relief valve 50, another relief valve 52, and a manually adjustable by-pass valve 54.

Figure 2:
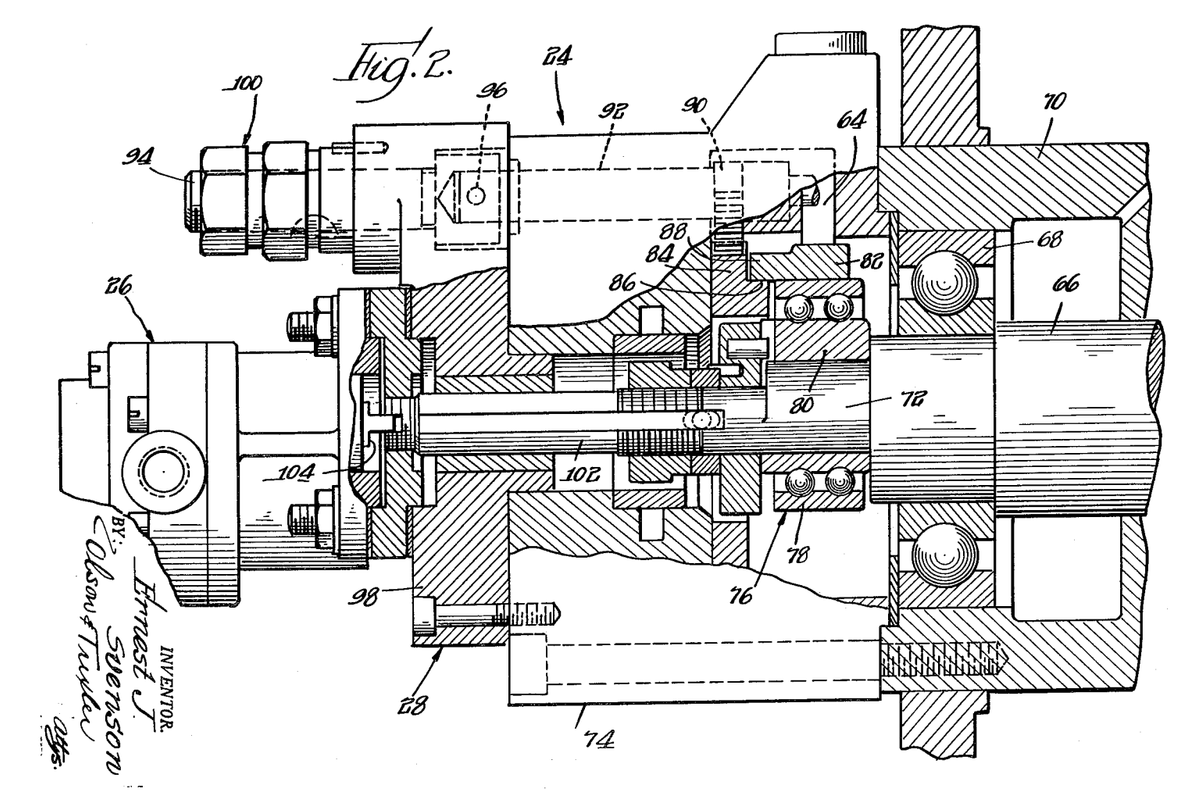
FIG. 2 is an elevational view, partially broken away, showing a pump assembly incorporated in the apparatus.

The gear pump 26 of the feed pump assembly 24 which is shown in FIGS. 1 and 2 may be of known construction and, therefore, need not be described in detail. It suffices to state that the gear pump is continuously driven and delivers compressed hydraulic fluid under pressure for charging the plunger pump 28. While hydraulic fluids or liquids are generally thought to be incompressible by the laymen, they are nevertheless slightly compressible as shown in Research Paper No. 244 of the National Bureau of Standards, volume 5, November, 1930. From this research paper it may be determined that a turbine oil frequently used in hydraulic actuating systems has a compressibility of approximately one-half of one percent when raised from a pressure of one p.s.i. to one thousand p.s.i. Preferably, the gear pump is provided with a built-in relief valve 56 for directing any fluid not required by the plunger pump back to the inlet side of the gear pump.

The plunger or piston pump 28 is adapted to be charged with the compressed hydraulic fluid under pressure from the gear pump and then to deliver a metered amount of compressed hydraulic fluid under pressure for actuating the fluid motors. The piston pump is provided with a plurality of piston chambers indicated at 58, 60 and 62 in FIG. 1, and a piston or plunger 64 is disposed in each of these chambers. The piston chambers are charged and the pistons are forced inwardly by the fluid under pressure from the gear pump, and the pistons are forced outwardly to pump the hydraulic fluid from the chambers by means partially shown in FIG. 2. This means includes a shaft 66 rotatably supported by one or more bearing assemblies 68 mounted in a housing 70 and continuously driven from a prime mover or an electric motor, not shown. The shaft has an eccentric portion 72 which extends within the body 74 of the piston pump in alignment with the piston and carries a bearing assembly 76 having an outer race 78 and an eccentric inner race 80. One end of a pivotally mounted lever 82 is disposed between the outer race 78 and an associated plunger or piston 64 so that as the lever is shifted by the eccentrically mounted and formed bearing assembly which rotates with the shaft 66, its associated plunger is reciprocated. In order to adjust the length of the piston strokes and thereby adjust the volume of hydraulic fluid which is metered through the plunger pump, adjustable means is provided for limiting the inward movement of each of the levers 82 and, therefore, the inward movement of each of the pistons. This adjustable means includes a gear 84 rotatably mounted in the pump housing and having a plurality of cam portions 86, each projecting for cooperation with a finger or extension 88 of one of the levers 82. The cam portions 86 are formed so that by rotating the gear 84 inward movement of the levers and pistons is adjusted. In order to rotate the gear 84 and thereby adjust the cam portions 86, a pinion 90 meshes with the gear 84 and is fixed on a shaft 92 rotatably mounted in the pump body 74. The shaft 92 is coupled with a shaft 94 as at 96, which shaft 94 extends through an end plate 98 secured to the pump housing. Thus, upon rotation of the shaft 94 the pinion 90 rotates to adjust the gear 84. The shaft 94 and, therefore, the gear 84 may be locked in any adjusted position by nut means 100. In order to drive the gear pump 26, the shaft 66 is provided with an extension 102 which is coupled as at 104 with a drive shaft of the gear pump. As will be understood, the plunger pump is provided with suitable passageways and check valves in the body 74 for directing charging fluid from the gear pump into the piston chambers and for directing the fluid from the piston chambers to the outlet of the pump. In accordance with the present invention it is important to note that the relief valve 56 of the gear pump is set so that the pressure of the charging fluid directed from the gear pump to the piston pump is only slightly less than the pressure of the fluid delivered by the piston pump. With this arrangement the hydraulic fluid is already compressed substantially the same amount when it enters the piston pump as when it leaves the pump so that the effect of the compressibility of the hydraulic fluid has been substantially eliminated within the pump. While the piston pump is only briefly shown and described herein, certain structural details thereof such as the internal passageways, check valves, plungers, levers and eccentric actuating means are essentially the same as the corresponding elements of a piston pump shown and described in my copending application Serial No. 437,067 filed June 16, 1954, now Patent No. 2,921,437, to which application reference is hereby made to complete the disclosure relative to the piston pump.

As shown in FIG. 1 the gear pump 26 is provided with an inlet 106 which is connected with the reservoir by a conduit 108. The gear pump outlet 110 is connected with the feed pump or piston pump inlet 112 through the valve 36. More specifically, the conduit 114 extends between the gear pump outlet and an inlet port 116 formed in the body 118 of the valve 36 and a conduit 120 extends between the inlet port 112 of the piston pump and an outlet port 122 of the valve. As shown best in FIG. 5, the valve 36 includes a valve stem 124 slidably disposed in a central bore 126, which bore is intersected by the ports 116 and 122. The valve body 118 is also provided with a drain port 128 which is connected with the reservoir through the relief valve 52 by conduits 130 and 132 which communicate with the inlet port 134 of the relief valve and conduit 136 which extends between the outlet port 138 of the relief valve and the reservoir.

Figures 3, 4, 5:
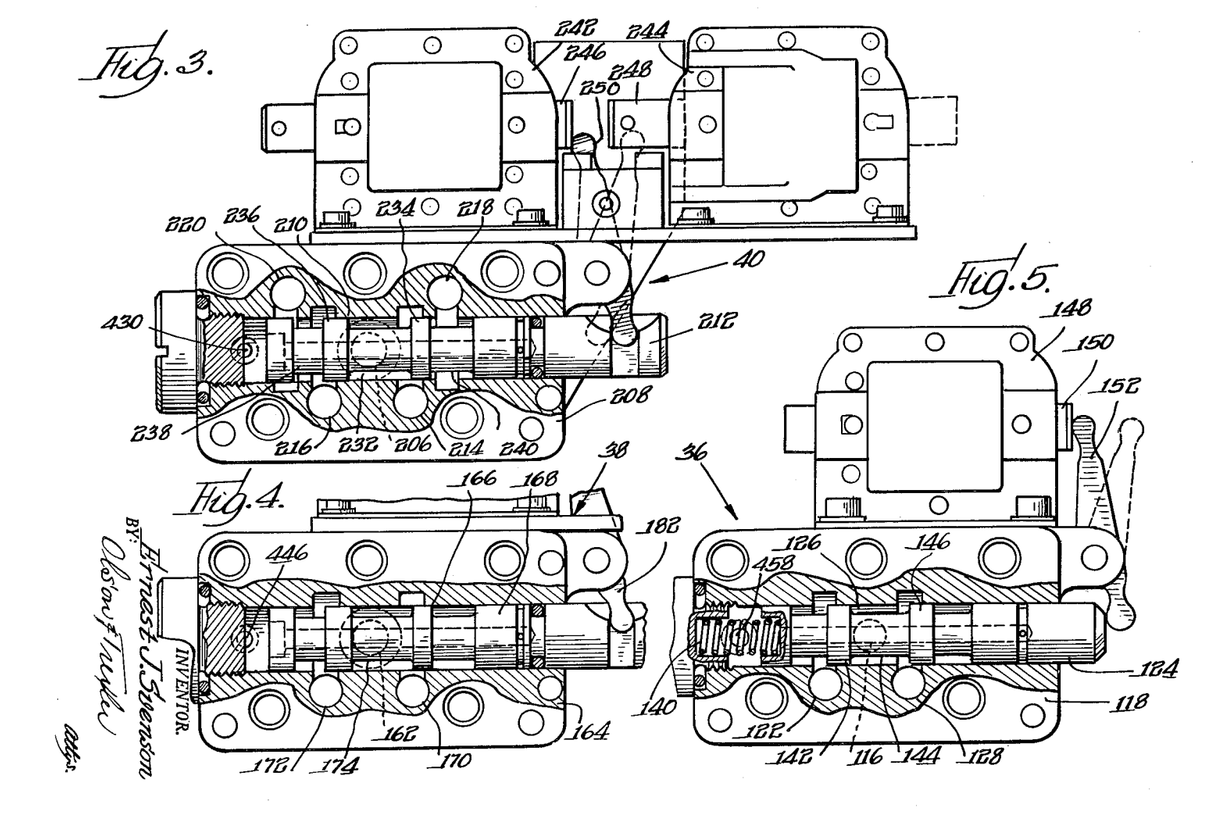
FIG. 3 is an elevational view, partially broken away, showing a two-position four-way detented directional control valve utilized in the apparatus.
FIG. 4 shows a two-position three-way directional control valve utilized in the apparatus.
FIG. 5 is an elevational view, partially broken away, showing another two-position four-way directional control valve utilized in the apparatus.

The valve stem 124 is normally resiliently biased to the position shown in FIG. 5 by a compression spring 140. In this position it is seen that the inlet port 116 is blocked from the outlet port 122 and thus, from the piston pump by a valve stem portion 142. At the same time, the inlet port 116 communicates with the drain port 128 along the reduced diameter portion 144 of the valve stem. When it is desired to actuate the fluid motors, the valve stem 124 is shifted toward the left as viewed in FIG. 5 so that communication between the inlet port 116 and the drain port 128 is broken by the valve stem portion 146 and the charging fluid may flow from the inlet port 116 along the reduced diameter portion 144 and through the outlet port 122. In order to shift the valve stem against the action of the spring 140 the valve is provided with a solenoid 148 having shiftable member 150 which actuates the valve stem through a pivotally mounted lever 152.

When the valve stem 124 is shifted from the neutral or stop position shown in FIG. 5 to the start position, charging fluid from the gear pump enters the piston pump and the piston pump meters and delivers a predetermined metered volume of fluid at a predetermined rate through its outlet port 154. The outlet port is connected with a conduit 156 which, in turn, is connected with a conduit 158. One end of the conduit 158 is connected with the normally closed safety relief valve 50 which, in turn, is connected with the reservoir by a conduit 160. The relief valve 50 functions to direct the fluid back to the reservoir in the event the pressure in the line 158 becomes unduly high. However, when the valves and the fluid motors are functioning properly and the fluid motors are not overloaded, the relief valve will remain closed and the fluid will be directed through the conduit 158 to the inlet port 162 of the valve 38.

As shown in FIGS. 1 and 4, the valve 38 includes a body member 164 having a central bore 166 in which a valve stem 168 is slidably disposed. The inlet port 162 intersects the bore, and the valve body is also provided with outlet ports 170 and 172 which communicate with the bore. With the valve stem 168 in the position shown in FIG. 4, the hydraulic fluid flows from the inlet port 162 along a reduced diameter portion 174 and into the outlet port 170. As is fully described below, the fluid is directed from the outlet port 170 so as to actuate the fluid motor 32 and in order to actuate the fluid motor 34, the valve stem 168 is shifted toward the left as viewed in FIG. 4 so as to direct the fluid from the inlet port 162 through the outlet port 172. It should be noted that the valve stem 168 is formed so that the inlet port 162 is always in communication with either the outlet port 170 or the outlet port 172. In order to shift the valve stem 168, the valve 38 is provided with a pair of solenoids 174 and 176, respectively, including shiftable members 178 and 180. The shiftable members actuate the valve stem through a pivotally mounted lever 182.

Figure 7:
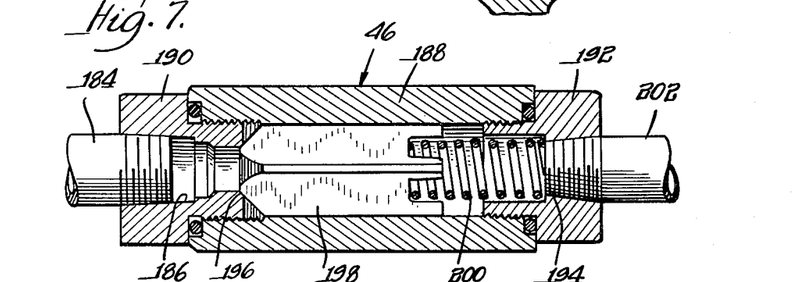
FIG. 7 is a sectional view showing a check valve utilized in the apparatus.

When it is desired to actuate or feed the shiftable element of the fluid motor 32, the valve stem 168 is located in the position shown in FIG. 4 so that the compressed hydraulic fluid from the piston pump is directed through the outlet port 170 into a conduit 184 connected therewith. The conduit 184 is connected with an inlet 186 of the check valve 46, which check valve is shown in detail in FIG. 7. The check valve 46 includes a tubular body member 188 having opposite ends closed by plugs 190 and 192 which respectively provide the inlet opening 186 and an outlet opening 194. At the inner end of the plug 190 there is provided a valve seat 196 against which a fluted valve member 198 is resiliently urged by a compression spring 200. As will be understood, the hydraulic fluid under pressure from the piston pump unseats the fluted valve member 198 so that the fluid may flow through the check valve and the outlet opening 194 into a conduit 202. The conduit 202 joins a conduit 204 which has one end connected with an inlet port 206 of the valve 40 and an opposite end connected with the valve 44. When the fluid motor 32 is to be actuated by the fluid from the piston pump, the valve 44 is positioned so as to block the associated end of the conduit 204 in the manner described below so that the fluid flows through the conduit 204 and into the port 206 of the valve 40. As shown in FIG. 3 the valve 40 includes a body member 208 having a central bore 210 which is intersected by the inlet port 206 and in which a valve stem 212 is slidably disposed. The body member is also provided with outlet ports 214 and 216 which communicate with the central bore. In addition, the body member 208 is provided with ports 218 and 220 which communicate with the central bore. The ports 214 and 216 are respectively connected with opposite ends of the fluid motor 32 by conduits 222 and 224, and the ports 218 and 220 are connected with the inlet of the relief valve 52 by conduits 226 and 228, respectively, which conduits in turn are connected with a conduit 230 that joins the above described conduit 132. With the valve stem 212 in the position shown in FIG. 3 it is seen that communication is established between the inlet port 206 and the outlet port 214 by a reduced diameter portion 232 of the stem while the inlet port is blocked from the ports 218 and 220 by valve stem portions 234 and 236. The valve stem portion 236 also blocks the valve stem bore between the inlet port 206 and the outlet port 216. Thus, the fluid is directed to the lower end of the fluid motor 32 through the conduit 222, and fluid returns from the upper end of the fluid motor through the conduit 224 and passes into the valve body 208 through the port 216, around a reduced diameter portion 238 of the valve stem and out through the port 220 from where it is directed through the relief valve 52. In order to actuate the fluid motor 32 in the opposite direction, the valve stem 212 is shifted toward the left as viewed in FIG. 3 so that communication between the ports 206 and 216 is established. In addition, the valve stem portion 236 interrupts the passageway between the ports 216 and 220 and the valve stem portion 234 is shifted so that fluid may flow between the ports 214 and 218 around a reduced diameter portion 240 of the valve stem. When the valve stem 212 is shifted toward the left as just described, the fluid flows from the inlet port 206 through the port 216 and the conduit 224 to the upper end of the fluid motor, and fluid from the lower end of the motor returns through the conduit 222 into the port 214 from where it flows to the port 218 and through the conduit 226 and connecting conduits to the relief valve 52. In order to shift the valve stem 212 the valve 40 is provided with a pair of solenoids 242 and 244, respectively, including shiftable members 246 and 248 which actuate the valve stem through a pivotally mounted lever or finger 250.

While various fluid motors may be actuated in accordance with the present invention, the fluid motor 32 shown for purposes of illustration includes a hydraulic cylinder 252 and a double-acting piston 254 slidably disposed within the cylinder. One end of the cylinder is closed and sealed by suitable means 256 and a ram 258 is fixed to the piston and extends through suitable means 260 closing and substantially sealing the opposite end of the cylinder. The piston and ram are formed so that there will be a predetermined frictional resistance to relative sliding motion between them and the cylinder. By way of example only, this frictional resistance which is utilized in the manner described below may be such as to require the application of fluid under a pressure of four or five p.s.i. to the piston in order to obtain relative sliding movement between the piston and the cylinder.

Figure 6:
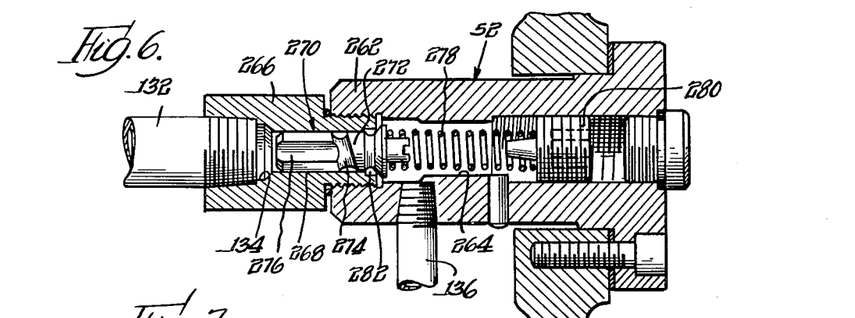
FIG. 6 is a sectional view showing a relief valve utilized in the apparatus.

The relief valve 52 which is shown in FIGS. 1 and 6 includes a body member 262 having a central bore 264 which communicates with the outlet conduit 136. An auxiliary body member 266 having the inlet opening 134 therein is threaded into the body member 262. The body member 266 is provided with a central bore 268 which slidably receives a valve member 270. The valve member has an uninterrupted portion 272 which serves to block the bore 268, and an annular groove 274 disposed at an angle to the axis of the valve member, and one or more grooves 276 for establishing communication between the inlet opening 134 and the annular groove 274. The valve member is resiliently biased to the position shown in FIG. 6 by a compression spring 278 which acts against an adjustable plug 280 threaded into the body member 262. As will be understood, the pressure at which the valve member 270 will be open may be adjusted by turning the plug 280 to vary the back pressure applied by the spring 278. In order to promote smooth operation of the relief valve, the annular groove 274 is inclined as described above so that as the valve opens and the groove emerges from the bore 268, the effective size of the valve opening or fluid passageway will increase or vary progressively rather than abruptly. Gradual opening and closing of the relief valve is also promoted by providing the body member 266 with a counterbore 282.

In accordance with the present invention, the apparatus thus far described is adjusted and operated as follows. The piston feed pump is, of course, adjusted to deliver a needed volume of compressed hydraulic fluid at a desired rate and at a desired pressure, and the gear pump relief valve 56 is adjusted so that the gear pump delivers charging fluid at a pressure only slightly below the pressure of the fluid delivered by the feed pump. By way of example only, it may be stated that the feed pump can be adjusted to deliver hydraulic fluid at a rate which will cause actuation or shifting of the fluid motor piston very slowly at about .0001 of an inch per second. In addition, the relief valve 52 is adjusted so as to provide a substantial back pressure in the fluid motor 32. This back pressure should be such that when added to the resistance or back pressure provided by the friction between the piston and the cylinder and the load applied to the ram, the total back pressure on the piston is sufficient to maintain the compressed actuating hydraulic fluid from the feed pump in a substantially uniform state of compression while, of course, permitting shifting or actuation of the piston. In this manner, surging or irregular motion of the piston is substantially eliminated and the piston may be actuated at a highly uniform rate of speed. When determining the back pressure to be provided by the relief valve 52, the difference in the areas at the opposite sides or ends of the piston as a result of the ram must be considered. In certain instances when the smaller end of the piston is very small as compared with the area of the larger piston end, it may be desirable to connect the conduits 226 and 228 with separate relief valves rather than with a single relief valve, which separate relief valves would then be adjusted to provide different hydraulic back pressures in accordance with the areas of their associated ends of the piston. However, the use of a single relief valve in the manner shown and described will be satisfactory in most cases.

After the various adjustments described above have been made, and with the piston 254 and the various valves in the position shown, the piston is raised at a relatively slow feed rate by providing an electrical signal which energizes the solenoid of the valve 36 to shift the valve stem 124 to the start position. This causes the charging fluid from the gear pump 26 to be directed to the piston feed pump so that the feed pump begins to deliver the compressed hydraulic actuating fluid. This fluid is directed through the valves 38 and 40 and a conduit 222 to the lower end of the cylinder in the manner described above for shifting or actuating the piston upwardly. The hydraulic fluid in the upper end of the cylinder is returned to the reservoir through the valve 40 and the relief valve 52 and is maintained in a compressed state under pressure by the relief valve in the manner and for the purpose described above. After the piston has been raised the desired amount, it is stopped, and in accordance with another important feature of the present invention the piston is stopped with great precision. For example, the piston may be stopped within .00001 (one hundred thousandth) of an inch or less. The stopping of the piston is accomplished by shifting the valve stem 124 of the valve 36 back to the stop position, at which position the charging fluid from the gear pump is cut off from the piston feed pump. When this occurs, the piston pump instantly stops delivering the actuating fluid and the check valves in the piston pump prevent previously delivered fluid from flowing back into the piston chambers. Furthermore, the check valve 46 prevents previously delivered fluid from returning from the fluid motor, but since in this respect, the check valve 46 duplicates the function of the check valves in the piston pump, the check valve 46 could be eliminated if it were not for the rapid traverse circuit to be described below. When delivery of the actuating fluid from the feed pump is stopped, the back pressure in the fluid motor causes substantially instant stopping of the piston. Furthermore, it is important to note that this back pressure maintains the actuating fluid trapped in the fluid motor in a compressed state so that there will be subsantially no shifting or actuation of the piston as would occur if the back pressure were eliminated and the actuating fluid were allowed to expand. It will be appreciated that any desired means may be provided for controlling the operation of the valve 36 and thereby controlling the operation of the fluid motor 32. However, by way of example, it may be stated that the solenoid of the valve 36 may be energized in response to a signal provided by a gauging device, not shown, checking a workpiece, and since the piston is actuated at a substantially uniform rate, a timer, not shown, may be provided for deenergizing the solenoid of the valve 36 after a predetermined time interval which corresponds to a predetermined amount of piston movement. As will be understood, when the piston 254 is in the raised position it may be fed downwardly in the same manner that it was fed upwardly except, of course, that the valve 40 should be actuated to direct the fluid from the feed pump to the upper end of the cylinder.

The fluid motor 34 and the elements of the apparatus particularly associated with it are identical to the corresponding elements of the apparatus described above and, therefore, will not be set forth in detail. It suffices to state that the outlet port 172 of the valve 38 is connected with the inlet of the check valve 48 by a conduit 290 and the outlet of the check valve is connected with an inlet port 292 of the valve 42 by a conduit 294. Ports 296 and 298 of the valve 42 which correspond to the above described ports 214 and 216 of the valve 40 are respectively connected with the lower and upper ends of the fluid motor 34 by conduits 300 and 302. Ports 304 and 306 of the valve 42 which corresponds with the above described ports 218 and 220 are connected with the back pressure conduit 230 by conduits 308 and 310, respectively. The fluid motor 34 is actuated at a feed rate in the same manner as the fluid motor 32 except, of course, that the valve 38 is shifted to establish communication between its inlet and outlet ports 162 and 172 and to block the inlet 162 from the outlet port 170.

Figure 9:
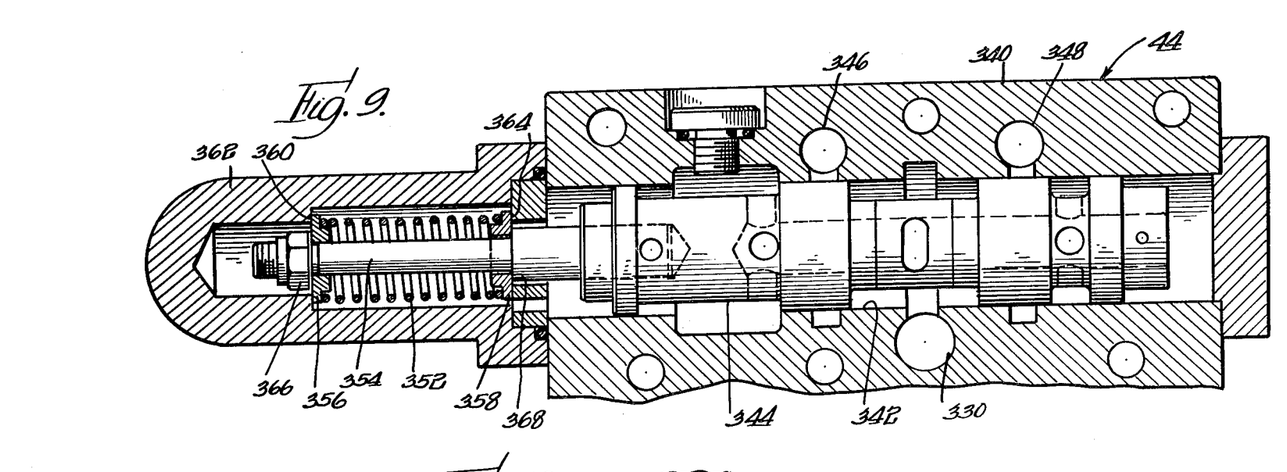
FIG. 9 is an elevational view partially broken away, showing a three-position four-way directional control valve utilized in the apparatus.

It is often desirable to actuate the pistons of the fluid motors relatively rapidly either to and from a feed position and, therefore, the apparatus is provided with the above mentioned rapid traverse pump 30. This pump may be of any known construction such, for example, as a rotary vane type pump similar to the pump shown and described in my Patent 2,588,430 dated March 11, 1952. The inlet of the rapid traverse pump is connected with the reservoir by a conduit 320, and hydraulic fluid under pressure is discharged from the rapid traverse pump into an outlet conduit 322. The outlet conduit connects with an inlet port 324 of the manually adjustable by-pass valve 54 and also with a conduit 326 which has branches 328, 330 and 332, respectively, communicating with ports 334, 336 and 338 of the valve 44. As shown in FIGS. 1 and 9, the valve structure 44 includes a body member 340 having a central bore 342 slidably receiving a valve stem 344 and communicating with the inlet port 336. In addition, a pair of outlet ports 346 and 348 in the valve body communicate with axially spaced portions of the bore. The valve stem is normally held in the position shown in FIG. 9 so that the port 346 which is connected with the above described conduit 204 is blocked and so that the port 348 is also blocked, which port is connected with the above described conduit 294 by a conduit 350. Thus, the fluid entering the port 330 is blocked and the valve 54 which will be described below functions to direct the fluid from the rapid traverse pump back to the reservoir. The valve stem 344 is resiliently held in the stop or neutral position shown by a spring 352 which surrounds a rod 354 connected with the valve stem. The spring acts against oppositely disposed collars 356 and 358 slidably mounted on the rod and respectively confined for limited movement by a shoulder 360 formed on a cap member 362 and an abutment provided by an annular ring 364. Furthermore, the rod is provided with an abutment in the form of a nut 366 for cooperating with the collar 356 and an abutment in the form of a shoulder 368 for cooperating with the collar 358. When the valve stem is shifted toward the right as viewed in FIG. 9, it is seen that the collar 356 will also shift toward the right so that the spring is compressed and will serve to return the valve stem to the neutral position. Also when the valve stem is shifted toward the left, the spring is compressed by the collar 358 and will serve to return the valve stem to the neutral position. The valve stem 344 is actuated either toward the right or toward the left by hydraulic fluid under pressure which flows from the branch conduits 328 and 332 into the ports 334 and 338 formed in an auxiliary valve body 370. Pilot valve means, not shown, is provided in the auxiliary valve body 370 for controlling the flow of fluid from the ports 334 and 338 to actuate the valve stem 344, and the pilot valve means is in turn actuated by solenoids 372 and 374.

When it is desired to actuate the fluid motor 32 rapidly, the solenoid 372 is energized to shift the valve stem 344 toward the right as viewed in FIG. 9 so that fluid may flow from the inlet port 330 to the outlet port 346. From the outlet port, the fluid flows through the conduit 204 to the valve 40 from where it may be selectively directed to either end of the fluid motor. The check valve 46 serves to prevent the flow of rapid traverse fluid back to the valve 38. It should be noted that during rapid traverse of the piston 254, back pressure is maintained in the fluid motor by the relief valve 52 in the manner described above and this enables the piston to be stopped in a precise manner after the rapid traverse movement has been completed. This is highly advantageous since the length of the feeding motion may be held to a minimum and a total time required for a given movement of the piston may be reduced. The fluid motor 34 may similarly be actuated by the rapid traverse pump merely by shifting the valve stem 344 toward the right as viewed in FIG. 9 so that fluid may flow from the inlet port 330 through the port 348 and conduits 350 and 294 to the valve 42. It should be noted that since the check valves 46 and 48 prevent the rapid traverse fluid from flowing to the valve 38, the apparatus may be operated so that one of the fluid motors is being shifted with a feeding motion while the other fluid motor is being shifted with a rapid traverse motion.

Figure 8:
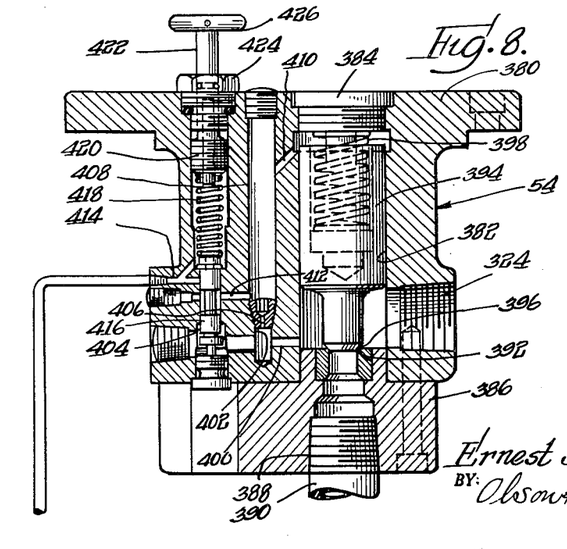
FIG. 8 is a sectional view showing a manually adjustable by-pass valve incorporated into the apparatus.

The manually adjustable by-pass valve 54 is shown in detail in FIG. 8 and includes a body member 380 having a bore 382 formed therein. The upper end of the bore is closed by a plug 384 and the lower end is closed by an auxiliary body member 386 having an outlet passageway 388 therein to which a drain conduit 390 is connected. A valve seat 392 is provided on the auxiliary body member and a piston 394 is slidably mounted in the bore 382 and is provided with a reduced diameter valve portion 396 adapted to engage the valve seat. The piston is yieldably biased by a spring 398 so as to urge the valve 396 against the valve seat. As will be understood, the hydraulic fluid entering the inlet port 324 will be blocked by the valve 396 until the pressure is raised sufficiently to force the piston upwardly against the action of the spring 398 to open the valve. However, in order to adjust the pressure at which the piston 394 will rise, the valve structure 54 includes means for providing and adjusting a hydraulic back pressure in the upper end of the bore 382. This means includes a passageway 400 communicating with the lower end of the bore 382 and intersecting a passageway 402 and a bore 404. Fluid entering the passageway 402 is metered through a restricted orifice 406 and then flows into a passageway 408. The passageway 408 is connected with the upper end of the bore 382 by a passageway 410 and it is also connected with the bore 404 by a passageway 412. A drain passageway 414 also intersects the bore 404. A valve stem 416 is slidably disposed in the bore 404 and is resiliently biased to the position shown by a compression spring 418 which acts against a threaded plug 420. The threaded plug 420 is connected to or made integral with a stem 422 projecting through a seal 424. A knob 426 is secured to the outer end of the stem 422 so that the position of the plug 420 may be easily manually adjusted to adjust the pressure applied by the spring 418. With the structure just described, hydraulic fluid flows from the lower portion of the bore 382 into the passageway 400 and a portion of this fluid is metered and directed to the upper end of the piston 394 to aid the spring 398 in resisting opening of the valve 396. Another portion of the fluid flows into the lower end of the bore 404 and tends to raise the valve stem 416 against the action of the spring 418. When the fluid pressure in the lower end of the bore 404 builds up to a predetermined amount which is controlled by the adjustment of the spring 418, the valve stem 416 is shifted upwardly so as to establish communication between the passageways 412 and 414. This relieves the hydraulic back pressure against the upper end of the piston 394 so that the valve 396 is permitted to open.

As shown in FIG. 3, there is a small chamber at the left end of the valve bore 210 into which a small amount of fluid may leak past the valve stem, and in order to drain any leakage fluid, a drain port 430 is provided. This drain port is connected with the reservoir by conduits 432, 434, 436, 438 and 440. The other above described directional control valves are provided with similar drain ports which are also connected with the reservoir. More specifically, the valve 42 is provided with a drain port 442 which is connected to the drain conduit 434 by a conduit 444, the valve 38 is provided with a drain port 446 which is connected with the drain conduit 434 by a conduit 448, the valve 44 is provided with a pair of drain ports 450 and 452 which are connected with the drain conduit 440 by conduits 454 and 456, and the valve 36 is provided with a drain port 458 which is connected with the drain conduit 160 by a branch 460.

Figure 11:
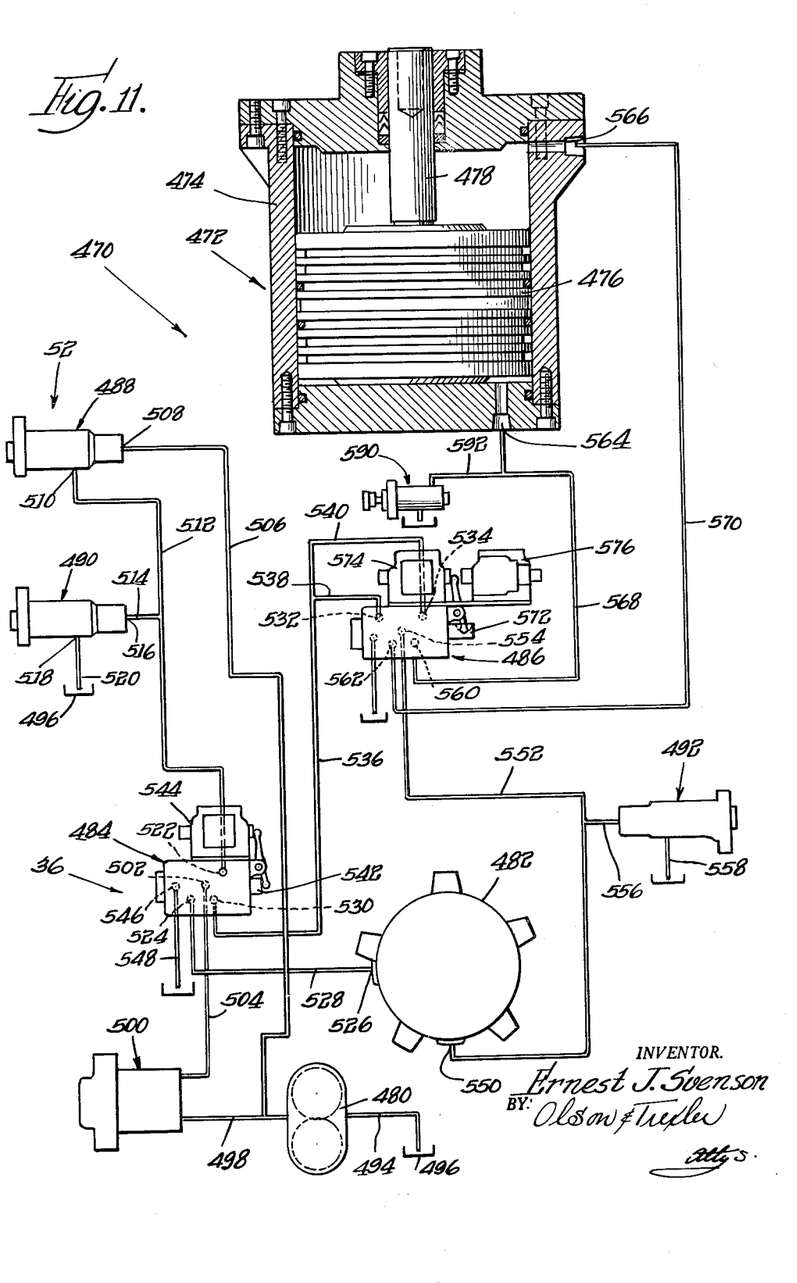
FIG. 11 is a diagrammatic view showing a modified form of apparatus for carrying out the present invention.

In FIG. 11 there is shown an apparatus 470 embodying a modified form of the present invention. This embodiment of the apparatus includes a fluid motor 472 comprising a cylinder 474 and a relatively slidable double-acting piston 476 which is connected with a ram 478. The piston is formed so that there will be a predetermined amount of frictional resistance to relative sliding motion between the piston and the cylinder. The apparatus 470 also includes a gear pump 480 of known construction, a piston type feed pump 482 similar to the feed pump described above, a directional control valve 484 similar to the above described valve 36, a directional control valve 486 similar to the above described valve 40 and a plurality of the relief valves 488, 490 and 492 similar to the above described relief valve 52.

The inlet side of gear pump 480 is connected by a conduit 494 with a reservoir 496 and the compressed hydraulic fluid under pressure is discharged from the gear pump into a conduit 498. The conduit 498 is connected with the inlet of a filter 500 and the outlet of the filter assembly is connected with an inlet port 502 of the valve structure 484 by a conduit 504. In addition, the conduit 498 is connected by means of a conduit 506 with the inlet 508 of the relief valve 488. The relief valve outlet 510 is connected by conduits 512 and 514 with the inlet 516 of the relief valve 490, and the outlet 518 of the relief valve 490 is connected with the reservoir 496 by a conduit 520. The conduit 512 is also connected with a port 522 of the valve structure 484. The valve structure 484 is also provided with a port 524 which is connected with an inlet port 526 of the feed pump by a conduit 528, and a port 530 which is connected with ports 532 and 534 in the valve structure 486 by a conduit 536 and branch conduits 538 and 540. The valve structure 484 is provided with a shiftable valve stem 542 which may be actuated by a solenoid 544 to and from start and stop positions. The valve stem 542 is constructed so that when it is in the stop position, the inlet port 502 is connected with the port 530 and these ports are blocked from the ports 522 and 524, and when the valve stem is in the start position, the port 502 is connected with the port 524 and communication is established between the ports 522 and 530. The valve structure 484 is provided with a drain port 546 through which any leakage fluid may pass into a drain line 548.

The piston type feed pump 482 has an outlet 550 which is connected by a conduit 552 with an inlet port 554 of the valve structure 486. This conduit is also connected by a branch conduit 556 with an inlet of the safety relief valve 492 which is normally closed and which functions to prevent injury to the apparatus. The outlet of the relief valve 492 is connected by a conduit 558 with the reservoir. The valve structure 486 is also provided with ports 560 and 562 which are respectively connected with ports 564 and 566 in the lower and upper ends of the cylinder by conduits 568 and 570. The valve structure 486 is provided with a valve stem 572 which may be actuated in opposite directions by solenoids 574 and 576. The valve stem 572 is formed so that when it is in the position shown, the ports 554 and 560 are connected, the ports 532 and 562 are connected and the port 534 is blocked. When the valve stem is shifted from the right hand position shown toward the left, the ports 554 and 562 will be connected and the ports 534 and 560 will be connected, while the port 532 will be blocked.

The operation of the apparatus 470 is as follows. Starting with the piston and the directional control valve stems in the positions shown, the gear and feed pumps are continuously driven by any suitable means such as an electric motor, not shown. The hydraulic fluid delivered by the gear pump is returned to the reservoir through the relief valves 488 and 490 which are connected in series. The pressure of the hydraulic fluid is controlled by the relief valves, which, merely by way of example, may be adjusted to open under a pressure of 25 p.s.i. Since the relief valves are connected in series, the pressure of the hydraulic fluid at the discharge side of the gear pump will be about 50 p.s.i. At the same time hydraulic fluid in the conduits 504, 536, 538, 570 and in the upper end of the fluid motor is raised to about 50 p.s.i. since, as described above, the ports 502 and 530 in the valve 484 are connected and the ports 532 and 562 in the valve 486 are connected. However, since the port 524 in the valve 484 is blocked, no charging fluid is directed to the piston type feed pump so that the feed pump is not delivering any fluid. Now, to initiate upward feeding movement of the piston 476, the solenoid 544 is energized to shift the valve stem 542 to the start position. When this occurs, the port 502 is connected with the port 524 so that charging fluid is delivered to the feed pump and the feed pump begins delivering compressed hydraulic actuating fluid under pressure which is directed by the valve structure 486 to the lower port 564 of the fluid motor. At the same time, the port 530 of the valve structure 484 is connected with the port 522 and thus with the relief valve 490 so that the back pressure in the upper end of the fluid motor is instantaneously dropped to about the pressure setting of the relief valve 490. This sudden lowering of the back pressure in the fluid motor facilitates rapid and smooth starting of the piston since any tendency for the piston to stick as a result of friction is substantially instantaneously overcome. However, it should be noted that the back pressure in the fluid motor during the feeding movement is still sufficient to maintain the hydraulic actuating fluid delivered by the feed pump in a compressed state so as to promote uniform motion of the piston. Upward feeding movement of the piston may be stopped at any time in a precise manner by merely shifting the valve stem 542 back to its stop position so as to cut off the charging fluid from the feed pump. It is important to note that when the valve stem 542 is shifted back to the stop position, the back pressure in the upper end of the fluid motor is substantially instantaneously raised to approximately the same pressure as the actuating fluid which is trapped between the lower end of the piston and the check valves in the piston type feed pump. Thus, the piston is stopped instantaneously and the trapped actuating hydraulic fluid is maintained in a compressed state, so that any further actuation of the piston is prevented. In accordance with the present invention, the friction between the piston and cylinder is utilized to prevent further shifting of the piston in the event that the product of the back pressure times the piston area against which it acts is not quite equal to the product of the trapped actuating fluid pressure times the piston area against which it acts.

Figure 10:
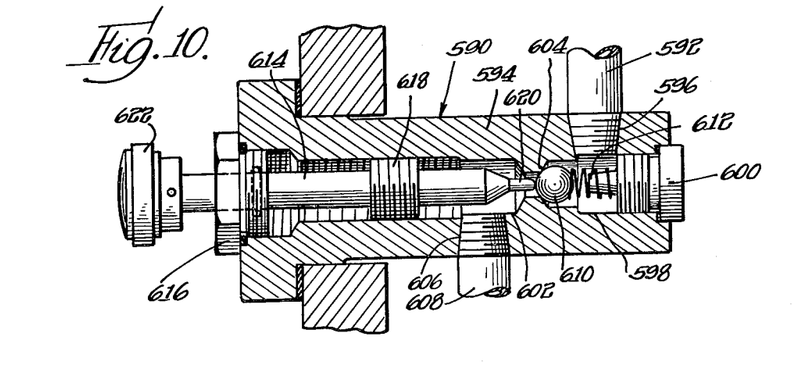
FIG. 10 is a sectional view of a manually operated ball seat reset valve utilized as a modification in carrying out the present invention.

As will be understood, the piston may be fed downwardly in the same manner as it is fed upwardly merely by shifting the valve stem 572 of the valve structure 486. However, as mentioned above in the description relating to the apparatus 20, the feeding motion is relatively slow. Therefore, in many instances it is desirable to provide the apparatus 470 with means for rapidly traversing the piston downwardly. This may be accomplished by providing the apparatus 470 with a manually operated reset valve 590 which is connected to the port 564 of the cylinder by a conduit 592. A shown best in FIG. 10, the reset valve 590 includes a body member 594 having an inlet port 596 connected with the conduit 592 and intersecting a valve chamber 598 which has one end closed by a plug 600. The body member is also provided with a central passageway 602 and a valve seat 604 between the valve chamber and the passageway 602. An outlet port 606 communicates with the passageway 602 and is connected with a drain line 608. The aperture through the valve seat is normally closed by a ball type valve member 610 which is resiliently biased against the seat by a spring 612 and which is also normally held against the seat by the hydraulic actuating fluid under pressure. Means is provided for manually shifting the valve member off the seat and this means includes a stem 614 which projects through a sealing device 616 and has an enlarged threaded portion 618. The stem also is provided with a finger portion 620 for engaging the ball valve without blocking the valve passageway so that when the stem is turned to thread it further into the valve body, the ball valve is unseated and the valve is opened. Preferably, a knob 622 is secured to the outer end of the stem to facilitate turning thereof. When the valve 590 is opened, the fluid in the lower end of the cylinder flows through the valve and back to the drain. At the same time, the fluid under pressure in the upper end of the cylinder forces the piston down rapidly.

While preferred embodiments carrying out the method have been shown and described, it is obvious that many changes may be made without departing from the spirit and scope of the appended claims.

I claim:
1. A method of actuating a fluid motor comprising positively delivering compressed hydraulic actuating fluid to the motor, providing a predetermined back pressure in the fluid motor sufficient to permit actuation of the motor while continuously maintaining said actuating hydraulic fluid in a compressed state, and stopping delivery of the actuating hydraulic fluid to the motor while constantly maintaining a back pressure at least as great as said predetermined back pressure and while positively preventing reverse flow of hydraulic fluid previously delivered to the fluid motor and maintaining the actuating hydraulic fluid previously delivered to the fluid motor under pressure and in a compressed state to eliminate substantially any further actuation of the motor.

2. A method of actuating a fluid motor comprising positively applying compressed hydraulic actuating fluid under pressure to the fluid motor, providing a back pressure in the fluid motor with compressed hydraulic fluid under pressure, which back pressure is sufficient to prevent actuation of the motor, substantially simultaneously positively delivering additional compressed hydraulic actuating fluid under pressure to the motor and relatively lowering siad back pressure sufficiently to permit actuation of the motor while continuously maintaining said actuating hydraulic fluid in a compressed state, and then stopping delivery of actuating hydraulic fluid to the motor while positively preventing reverse flow of previously delivered actuating fluid and maintaining the actuating fluid previously delivered under pressure and in a compressed state and simultaneously relatively increasing said back pressure to eliminate substantially any further actuation of the motor.

3. A method of stopping a hydraulic motor with precision, which motor is being actuated by positively delivered compressed hydraulic fluid under pressure comprising stopping delivery of hydraulic actuating fliud to the motor while positively preventing reverse flow of hydraulic fluid previously delivered to the motor and maintaining the hydraulic fluid previously delivered to the motor in a predetermined compressed state under pressure, and providing and continuously maintaining a back pressure in the fluid motor sufficient to maintain said hydraulic fluid continuously in at least said compressed state so as to eliminate substantially any further actuation of the motor.

References Cited in the file of this patent
UNITED STATES PATENTS

| | | |
|---|---|---|
| 913,853 | Rowntree | Mar. 2, 1909 |
| 1,663,513 | Howse | Mar. 20, 1928 |
| 2,005,731 | Ernst | June 25, 1935 |
| 2,024,251 | Romaine | Dec. 17, 1935 |
| 2,345,973 | Harrington | Apr. 14, 1944 |
| 2,493,828 | Parsons | Jan. 10, 1950 |
| 2,497,608 | Herrstrum et al. | Feb. 14, 1950 |
| 2,589,204 | Parsons | Mar. 11, 1952 |
| 2,605,707 | Worlidge | Aug. 5, 1952 |
| 2,644,307 | Blair | July 7, 1953 |
| 2,656,445 | Svenson | Oct. 20, 1953 |

FOREIGN PATENTS

| | | |
|---|---|---|
| 418,221 | Great Britain | Oct. 19, 1934 |